US005254859A

United States Patent [19]

Carman et al.

[11] Patent Number: 5,254,859

[45] Date of Patent: Oct. 19, 1993

[54] SAWMILL METHOD AND APPARATUS WITH EDGE SCANNING MEANS

[75] Inventors: George M. Carman, Corvallis; Mark L. Carter, Springfield, both of Oreg.

[73] Assignee: Aaron U. Jones, Eugene, Oreg.

[21] Appl. No.: 877,942

[22] Filed: Apr. 30, 1992

Related U.S. Application Data

[63] Continuation-in-part of Ser. No. 867,051, Apr. 10, 1992, Pat. No. 5,249,491, Continuation-in-part of Ser. No. 710,525, Jun. 3, 1991, abandoned, which is a continuation of Ser. No. 541,092, Jun. 20, 1990, Pat. No. 5,088,363, which is a continuation of Ser. No. 89,489, Aug. 21, 1987, abandoned.

[51] Int. Cl.[5] .............. G01N 21/86

[52] U.S. Cl. .............. 250/560; 83/365

[58] Field of Search .............. 250/560, 561, 223 R, 250/571; 356/376, 384, 386; 209/517, 518; 83/365; 144/357, 378

[56] References Cited

U.S. PATENT DOCUMENTS

| | | | |
|---|---|---|---|
| 3,802,774 | 4/1974 | Eschler et al. | 250/560 |
| 4,188,544 | 2/1980 | Chasson | 250/560 |
| 4,196,648 | 4/1980 | Jones et al. | 83/365 |
| 4,308,461 | 12/1981 | Tuomaala | 250/561 |
| 4,468,992 | 12/1982 | McGeehee | 83/56 |
| 4,541,722 | 9/1985 | Jenks | 250/561 |

*Primary Examiner*—David C. Nelms

*Assistant Examiner*—K. Shami

*Attorney, Agent, or Firm*—Dellett and Walters

[57] ABSTRACT

A flitch or cant is successively transported by a pair of differentially operated clamps, first to a scanning station, and then to a sawing station where the wane is removed. A series of flitches are processed in this manner such that as the wane edge from a first flitch is sawn, a next flitch in succession is optically scanned. The sawing and scanning is accomplished by means of a combination saw and scanner which moves in a direction longitudinal of the flitch as respective flitches are held in stationary positions at the sawing station and at the scanning station. Between passes of the saw-scanner combination, the sawn flitch is conveyed away and the next flitch in line is conveyed forwardly to the sawing position while being skewed by the clamps in accordance with the characterization generated by the scanner. The scanner extends outwardly from the side edges of the flitch to provide a radiation beam directed obliquely inwardly and downwardly from a point displaced along the flitch from the location where the radiation image intersects the flitch and provides a line image. Television cameras also disposed to the side of the flitch view the line image at an oblique angle, but the cameras are positioned along the flitch in a second direction opposite the direction where the radiation source was located. The cameras "see" the line images on the side edge of a flitch substantially face on.

17 Claims, 13 Drawing Sheets

SAWMILL METHOD AND APPARATUS WITH EDGE SCANNING MEANS

CROSS-REFERENCE TO RELATED APPLICATIONS

This is a continuation-in-part of co-pending patent application Ser. No. 07/867,051, filed Apr. 10, 1992, now U.S. Pat. No. 5,249,491, which is a continuation-in-part of co-pending patent application Ser. No. 07/710,525 filed Jun. 3, 1991, which is a continuation of patent application Ser. No. 07/541,092 filed Jun. 20, 1990, now Pat. No. 5,088,363 issued Feb. 18, 1992, which is a continuation of patent application Ser. No. 07/089,489 filed Aug. 21, 1987, now abandoned.

BACKGROUND OF THE INVENTION

This invention relates to sawmill apparatus, and particularly to a method and apparatus for measuring a cant or flitch for edging employing edge scanning.

Many types of sawmills are employed to cut dimension lumber from substantially cylindrical logs. Generally, the first step in cutting a log to produce dimension lumber involves cutting slabs from sides of the log so that the resulting cant has two parallel faces. As the cant is held in end dogs, it is fed through a bandmill, and flitches (or cants) are cut therefrom wherein each flitch has parallel faces joined by two longitudinal side edges. The two longitudinal side edges are so-called wane edges, i.e., they are usually not perpendicular to the main faces of the flitch but are curved and inclined relative to the main faces. The flitches are suitably conveyed longitudinally to a pin stop table where they are advanced in a direction transverse to their length and upon which the flitches are moved transversely under or over scanner means including a plurality of photocell detectors used to create a model of the flitch. From the pin stop table, the flitch is advanced to an edger where one or both waney edges of the flitch are removed by means of a circular saw fed along a path in transverse relative to the direction of feed of the flitches over the pin stop table. Alternatively the flitch is advanced longitudinally into the saw.

In the apparatus described in Pat. No. 4,196,648, employing photocell scanner technology, cants or flitches are desirably oriented on a pin stop table with the wane up so they can be properly viewed. This assumes the wane is easily seen at both edges of the flitch, e.g. wherein the flitch widens away from the scanner so the wane can be viewed from above. However, for flitches cut from large logs it is possible for the wane along at least one edge of the flitch to recede inwardly or negatively behind or under the visible face of the flitch where it cannot be seen by the foregoing type of scanner apparatus. Furthermore, one or both edges may even change from positive wane to negative wane along the length of the flitch and an improper measurement will result.

Moreover, photocell scanners as described in Pat. No. 4,196,648 view a flitch at approximately one foot intervals along the flitch. In order to maximize recovery of lumber from a flitch it would be desirable to provide a more detailed model such that dimensional variations and imperfections will not be missed, for example it would be desirable to measure the cross-section of the flitch at two or three inch intervals. Based on the principles described in Pat. No. 4,196,648, this would require a large number of scanner devices and would add substantially to the expense of acquiring information regarding the configuration of the flitch.

Accurate viewing of the complete length of a flitch with a single detector, e.g. by employing an intervening rotating mirror or the like between the detector and a stationary flitch, can be inaccurate because of long optical distances between parts of a flitch and the scanner. While a flitch or cant can be moved longitudinally relative to a fixed detector, continuously maintaining accurate orientation of the flitch or cant during scanning, followed by accurate reorientation thereof for sawing, can be very difficult mechanically.

SUMMARY OF THE INVENTION

In accordance with an embodiment of the method and apparatus of the present invention, a scanner comprises illuminating means for projecting an elongated image substantially crossways of the upper face of a cant or flitch disposed on a sawmill conveyor. The illuminating means is positioned above and outboard of a side edge of the flitch at an oblique angle whereby to project an elongated image in intersecting relation with the side edge, the illuminating means also being displaced longitudinally along the cant or flitch from the projected image whereby the elongated image on the edge of the cant or flitch makes an angle of approximately forty-five degrees with the vertical. The illuminating means preferably comprises plural laser light sources projecting a line or a series of line segments across the cant or flitch.

The scanner further includes detecting means for viewing the projected elongated image and such detecting means is also located outboard of the side edge of the flitch and thereabove, but is longitudinally removed in a second direction along the flitch, i.e., in a direction opposite to the longitudinal displacement of the illuminating means. The detecting means, which desirably comprises a plurality of television cameras, provides a viewing path at an angle of approximately forty-five degrees with respect to the vertical, or ninety degrees with respect to the elongated image on the edge of the flitch, such that a clear profile of the flitch is seen. The scanner is moved longitudinally with respect to the flitch whereby a plurality of profiles are generated which facilitate accurate modeling of the flitch including the side edge thereof.

Since both the illuminating means and the detecting means define inwardly directed light paths in oblique relation to the flitch, the elongated image is projected on the wane and viewed accurately even if the wane is negative. Therefore, a valid model of the flitch can be constructed for determining the correct position of the flitch for accurately alignment with the path of the saw, and incorrect characterization leading to waste of lumber is avoided.

It is accordingly an object of the present invention to provide an improved scanner and method of scanning cants and flitches in a sawmill.

It is another object of the present invention to provide an improved scanner and method of scanning capable of characterizing a negative wane on a cant or flitch.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION

Figure 1:
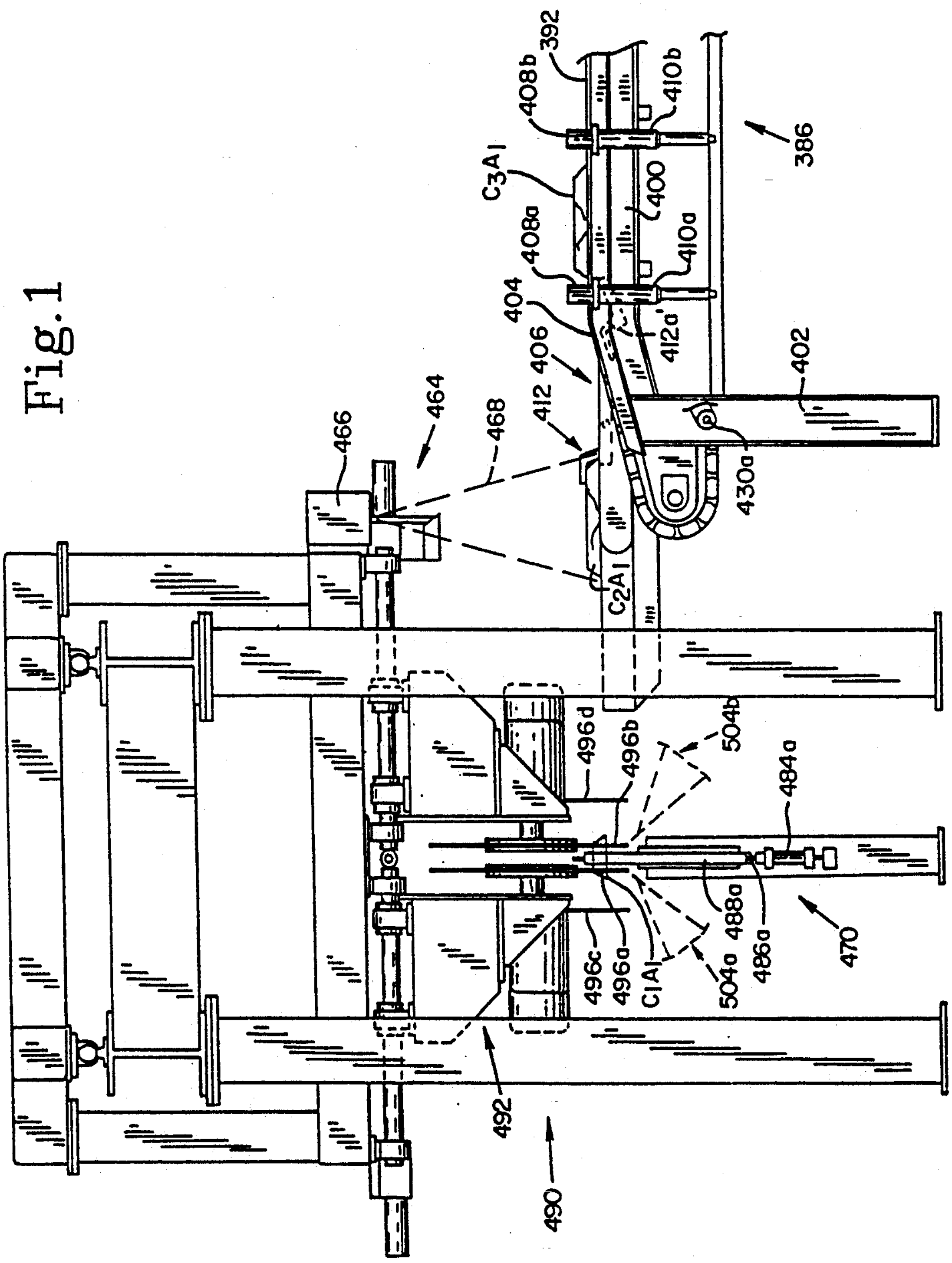
FIG. 1 is a side elevational view of the end of a pin stop deck upon which flitches or cants are carried toward a flying saw or edger.

Referring to the drawings and particularly to FIGS. 1 through 5 illustrating a portion of a sawmill according to the present invention, cants or flitches (designated $C_1A_1$, $C_2A_1$ and $C_3A_1$) sawn from a round log or logs are characterized by sloping or beveled forward and rearward edges referred to as waney edges or simply wanes. The forward and rearward edges or wanes correspond to the outer periphery of the log from which the cant or flitch is obtained. The cants or flitches have ideally been positioned with their wanes facing or viewable upwardly upon a conveying system comprising a pin stop deck 386 including a conveyor for moving the cants or flitches laterally to the left in FIGS. 1–3.

Referring particularly to FIG. 1, pin stop deck 386 includes frame 400 supported on legs 402 and over the full length of which passes a conveyor 392. At the distal end of a pin stop deck is located a downward sloping off-load deck portion 404 that leads to dead skid 406. It is the function of pin stop deck 386 to transport forwardly the cants or flitches placed thereon and transport them in timed relation so they will arrive at the off-load deck portion 404 at intervals to be picked up by dead skid 406.

The pin stop deck 386 includes at spaced intervals along the top surface thereof, and immediately adjacent conveyor 392, a plurality of mutually facing pin stop pairs, a representative pin stop being shown in FIG. 1 at 408. Each pin stop is contained within a corresponding sleeve 410 for guiding vertical movement thereof. In particular, each pin stop 408 can be moved upwardly within a corresponding sleeve so as to intercept the forward motion of a cant or flitch moving along conveyor 392, or alternatively downwardly to allow such a cant or flitch to pass. The general function and operation of pin stop decks are well known and require no further discussion. Cants or flitches $C_1A_1$, $C_2A_1$ and $C_3A_1$ are shown in FIG. 1 with their respective positions indicated. The third flitch in sequence, i.e., flitch $C_3A_1$, is illustrated as being located between pin stops **408*a* and 408*b***.

Figures 2, 3:
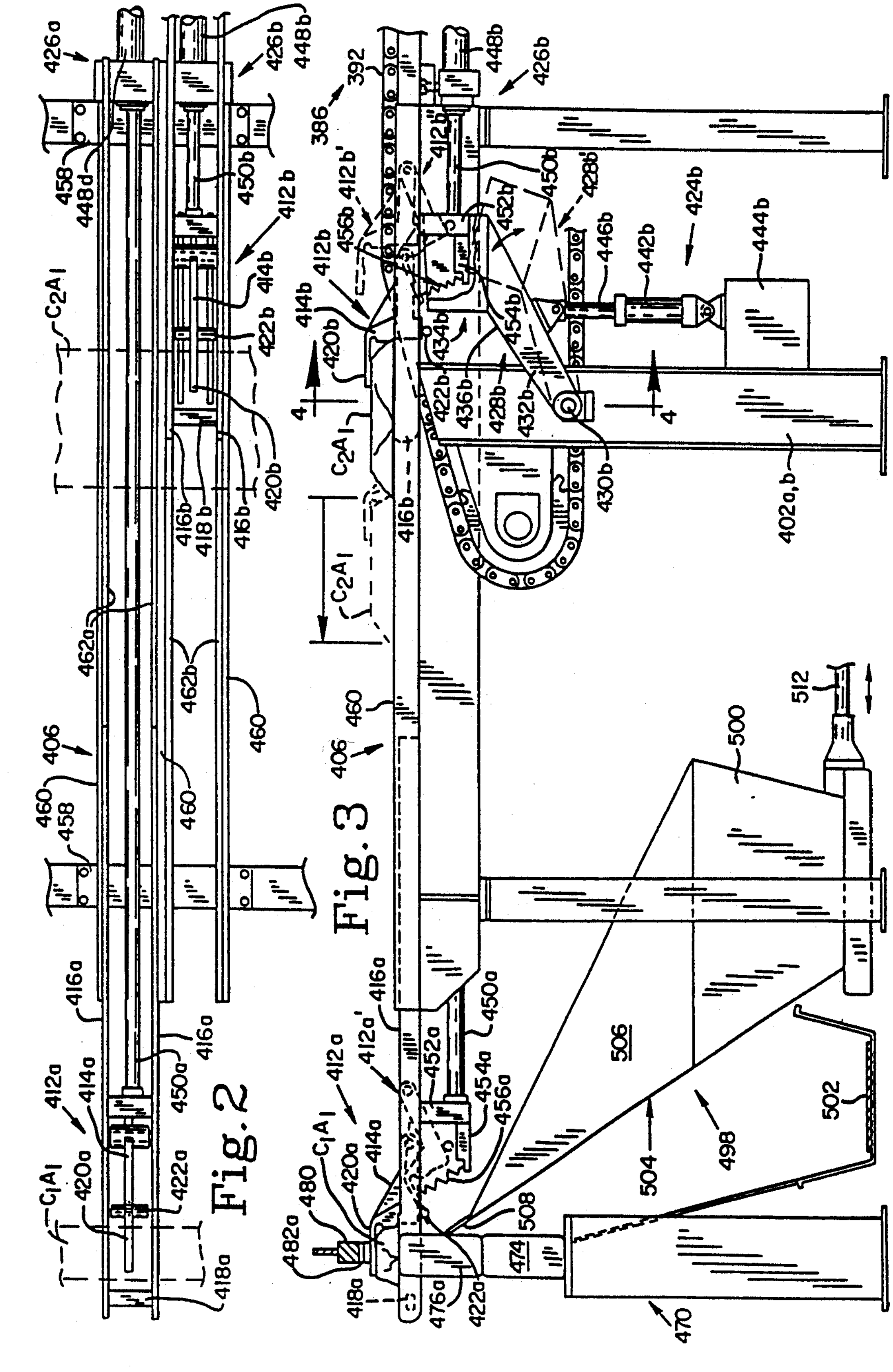
FIG. 2 is a plan view of a dead skid assembly and clamps as employed with the FIG. 1 apparatus.
FIG. 3 is a more detailed side elevational view of the dead skid area and illustrates cooperation with a flitch holder.

FIG. 2 is a plan view of one side of dead skid 406 including one clamp each of clamp pairs **412*a* and 412*b*. One complete clamp pair comprises clamps on opposite sides of and, except when skewing a flitch, will be in corresponding positions along the length of dead skid 406. FIG. 2 illustrates one clamp of a clamp pair 412*a* in an advanced position, and one clamp of a clamp pair 412*b*** in a retracted position.

In both FIGS. 2 and 3, clamp pairs **412*a* and 412*b* are in the process of unclamping cant or flitch $C_1A_1$ and clamping cant or flitch $C_2A_1$. Clamp pairs 412 include clamp holders 414 rotatably attached to clamp travelers 416 which lie in registry within the top surface of dead skid 406 and have clamp traveler struts 418 attached therebetween at the distal ends thereof. Clamp holders 414 can be described as having the approximate shape of a backwards letter "L", having cant grippers 420 extending downwardly from the distal end of the short leg of the "L". On the long side of the "L" there is located a cylindrical clamp pin 422 extending transversely to nearly equal distances on either side of clamp holder 414. These elements can also be seen in FIG. 4, which is a cross-sectional view through one side of dead skid 406**.

Clamp pairs **412*a*, 412*b* are operated by respective clamp lifts 424*a*, 424*b* attached to legs 402*a*, 402*b* of pin stop deck 386, and by horizontal travelers 426*a*, 426*b* attached to dead skid 406. One each of the clamp lifts 424*b* and horizontal travelers 426*b* are shown in FIG. 3. Horizontal travelers 426*a*, 426*b* are disposed in mutually parallel relation along the length of dead skid 406, and are seen in respective advanced and retracted positions in FIGS. 2 and 3, i.e., at corresponding distal and proximal ends of dead skid 406**.

As illustrated in FIG. 3, clamp lifts 424 include clamp lift arms 428 that are rotatably attached at clamp axles 430 to legs 402 and extend therefrom in the direction of the proximal end of dead skid 406. As can be seen in both FIGS. 3 and 4, clamp lift arms 428 include lift members 432, the proximal ends of which are attached to clamp lift axles 430, and clamp lift cams 434 attached to distal ends of clamp lift members 432.

Each of the clamp lift members 432 includes two mutually facing elongate clamp lift member plates **436*a*, 436*b* that taper to become wider along the length thereof progressively outwardly from clamp lift axles 430, and are held in facing, spaced-apart relationship by clamp lift dividers 438, the distance of the separation being such as to accommodate the length of clamp pins 422 thereabove. Positioned at about a 30° angle to the long axis of clamp lift member plates 436***a*, 436*b* are clamp lift slider plates 440*a*, 440*b*, forming the aforementioned cam 434. The opposite sides of clamp lift slider plates 440*a*, 440*b* are tapered in the direction towards the distal end of dead skid 406 and the tapered upper sides of clamp lift slider plates 440*a*, 440*b* may be brought into contact with clamp pins 422 near respective ends thereof.

Clamp lift actuators 442*a*, 442*b* forming part of clamp lifts 424*a* and 424*b* are rotatably attached to upper surfaces of corresponding clamp lift bases 444*a*, 444*b*, which in turn are attached to the sides of corresponding pin stop deck legs 402*a*, 402*b*. Upon activation of one of clamp lift actuators 442, a corresponding clamp lift rod 446 is caused to move therewithin, bringing about rotation of the corresponding clamp lift arm 428. In FIG. 3, for example, clamp lift arm 428*b* is shown in a raised position, while a clamp lift arm is shown in outline form in lowered position at 428*b'*.

The horizontal travelers 426*a*, 426*b* include respective clamp traveler actuators 448*a*, 448*b* and clamp traveler rods 450*a*, 450*b*, the distal ends of the latter being attached to clamp traveler links 452*a*, 452*b* which in turn are attached to respective clamp travelers 416*a*, 416*b*. The horizontal travelers 426*a*, 426*b* serve to move clamp travelers 416*a*, 416*b* to desired positions along the length of dead skid 406, e.g. to the positions as shown in FIGS. 2 and 3.

In operation, as illustrated for example in FIG. 1, a pin stop pair 408*a* may be lowered to such a position that flitch $C_3A_1$ can be moved forward (to the left in the drawing) by conveyor 392 so as to progress first onto off-load deck 404 and then onto dead skid 406. Flitch $C_2A_1$ in FIG. 1 has already undergone that operation, and has been clamped and moved farther forward. In FIGS. 2 and 3, flitch $C_2A_1$ is shown as undergoing the clamping process.

Clamp pair 412*b''* is illustrated in outline in FIG. 3 as being in a lowered position behind the course of travel of cant $C_2A_1$. An upward motion of clamp lift arm 428*b'* (shown in outline) so as to reach the position indicated in full line for clamp lift arm 428*b* will place cam 434*b* in contact with clamp pin 422*b* so as to force clamp pair 412*b''* into the position at 412*b'*. Forward motion of clamp traveler 416*b* by the action of clamp traveler actuator 448*b* then places clamp pair 412*b'* into position 412*b*, i.e., into a position at which flitch $C_2A_1$ will be clamped.

Clamp pairs 412*a*, 412*b* further include respective clamp spring arms 454*a*, 454*b* extending outwardly from lower portions of clamp traveler links 452*a*, 452*b* in the direction of the distal end of dead skid 406. Clamp springs 456*a*, 456*b* are located between respective distal ends of clamp spring arms 454*a*, 454*b* and respective cant grippers 420*a*, 420*b*. The positioning of clamp traveler 416*b* at the time that clamp pair 412*b''* is raised upwardly into position 412*b* is such that it is the higher end of the upper, tapered side of cam 434*b* that encounters clamp pin 422*b* and thus forces clamp pair 412*b'* to a high position as shown. The tension of clamp spring 456*b* is sufficient to maintain clamp pin 422*b* in position as clamp traveler 416*b* then moves forwardly. Then, clamp pin 422*b* drops off the left end of cam 434*b*, and the tension in clamp spring 456*b* urges cant gripper 420*b* downwardly into contact with flitch $C_2A_1$.The clamping process by clamp pair 412*b* is thus completed.

Figure 4:
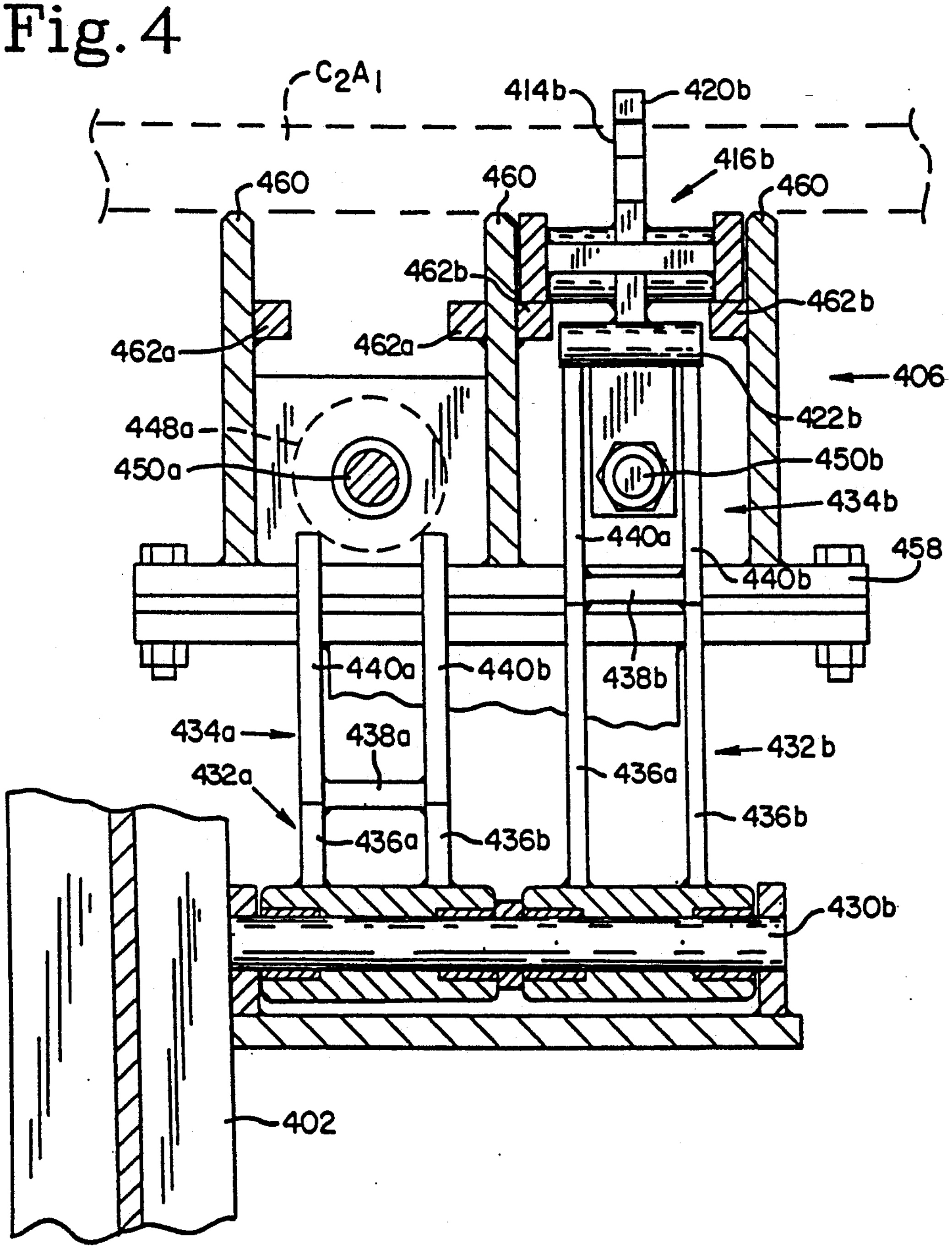
FIG. 4 is a cross section of the dead skid assembly taken along lines 4—4 in FIG. 3.

As can be seen in greater detail in FIG. 4, dead skid 406 includes on each lateral side thereof a horizontal dead skid base 458 that supports three laterally spaced and mutually parallel plates 460 separated by a sufficient distance to accommodate clamp travelers 416*a*, 416*b* therebetween. Also located between and in this case attached to dead skid plates 460 are respective pairs of clamp traveler rails 462*a*, 462*b* disposed along the length of dead skid 406 and also extending laterally therebetween, to provide a sliding surface along which clamp travelers 416*a*, 416*b* can be moved. For reasons that will be explained further below, and as can be seen from FIG. 3, clamp travelers 416*a*, 416*b* are sufficiently elongate to carry flitch $C_1A_1$ well forward of dead skid 406 while significant portions of clamp travelers 416*a*, 416*b* still remain within dead skid 406.

In FIG. 3, flitch $C_2A_1$ is shown in the position as having just been clamped, while in FIG. 1, flitch $C_2A_1$ is depicted in a more forward position under scanner 464. To move flitch $C_2A_1$ requires forward motion of clamp traveler 416*b* by clamp traveler actuator 448*b*.

Scanning of a flitch is accomplished by scanner 466. Scanner 466 suitably includes a laser beam source that essentially scans across the flitch as the scanner moves with the saw carriage as illustrated at 468. A television camera or cameras, also forming part of the scanner, provides an output according to the flitch's lateral dimensions. Scanning data is acquired from scanner 464 and computer means determines therefrom the optimum position and horizontal orientation or skew of a flitch so that it can be cut into the maximum amount of lumber. Also determined are the saw positions for "flying saw" 490 (hereinafter discussed).

The next step of the process relates to skew positioning of flitch $C_1A_1$ which can also be carried out by horizontal travelers 426*a*, 426*b*. Initially, a pair of clamp travelers can work in tandem to position a flitch for scanning. However, for skewing, the same two clamp travelers that control the positions of the opposite ends of a flitch $C_1A_1$ work differentially. That is, by moving the two clamp travelers 416*a* located on opposite sides of dead skid 406 by different amounts, flitch $C_1A_1$ may be made to rotate about a vertical axis for skew positioning.

Figure 5:
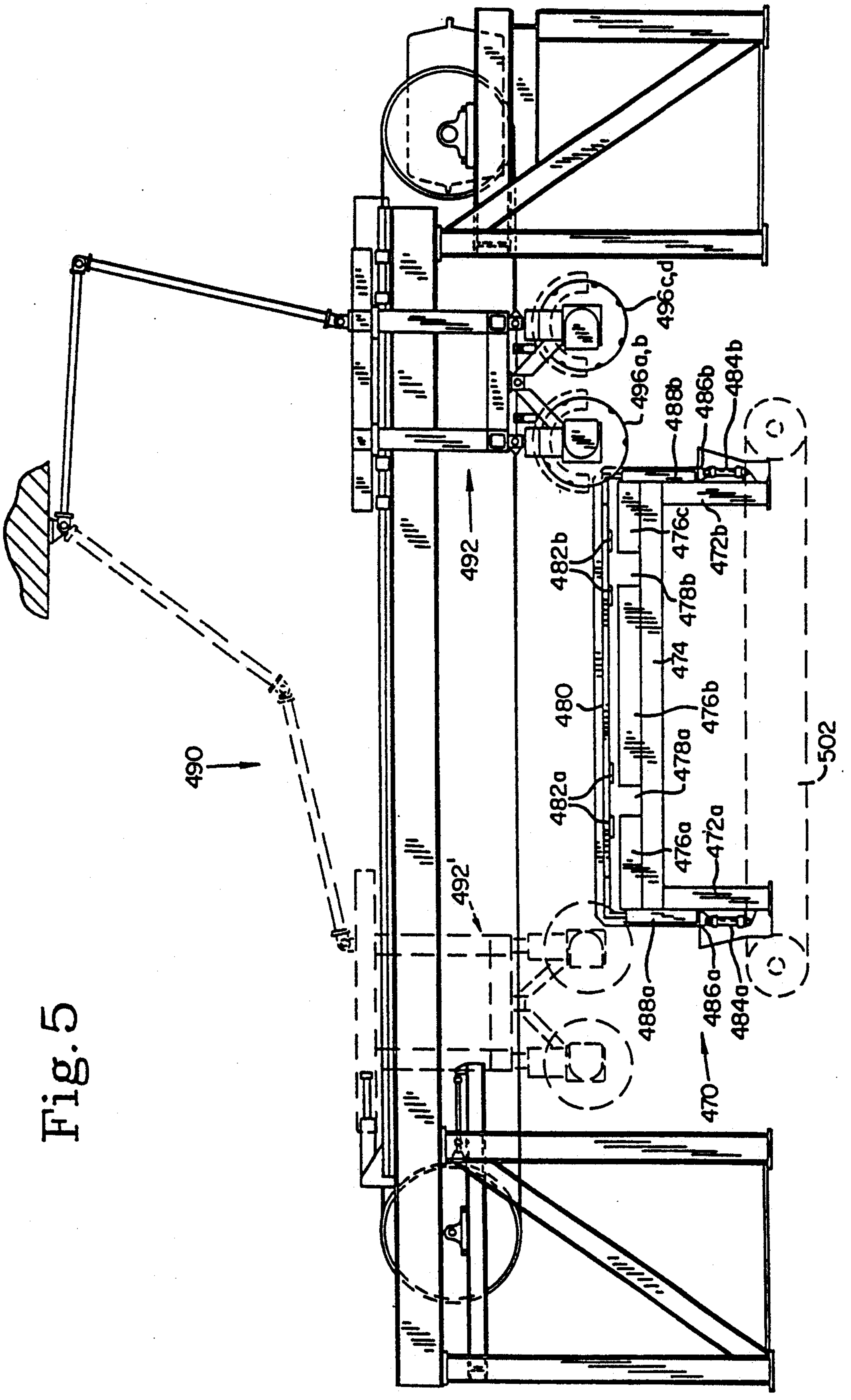
FIG. 5 is a side elevational view of a flying saw or edger together with a cant or flitch holder.

FIGS. 1, 3 and 5 illustrate a holder 470 that serves to hold each flitch for sawing. Holder 470 includes vertical struts 472*a*, 472*b* and a horizontal strut 474 supported at the top ends thereof. Horizontal strut 474, which is of sufficient length to accommodate a flitch, lies transverse to the long dimension of dead skid 406 and is displaced a predetermined distance therefrom. Of course, as can be seen in FIG. 3, that distance must be such that clamp travelers 416*a* (or 416*b*) with a flitch clamped thereto can extend outward from dead skid 406 to place a flitch atop holder 470.

Flitch supports 476*a*, . . . , 476*c* are attached on top of horizontal strut 474 so as to extend over vertical struts 472*a*, 472*b*, and are provided with clamp apertures 478*a*, 478*b* located therebetween. The purpose of clamp apertures 478*a*, 478*b* is to allow access within holder 470 of a portion of clamp pairs 412*a* and in particular clamp travelers 416*a* at a time when a flitch, such as flitch $C_1A_1$ in FIGS. 2 and 3, is placed upon holder 470.

Holder bar 480 is located over horizontal strut 474 and extends parallel thereto. Attached on the underside of bar 480 are spacer pairs 482*a*, 482*b* positioned so that one member of each pair lies immediately adjacent respective clamp apertures 478*a*, 478*b*. A flitch such as flitch $C_1A_1$, lying on cant supports 476*a*, . . . , 476*c*, is gripped in that position by bringing bar 480 downward, and spacer pairs 482*a*, 482*b* contact the flitch. Once gripping of the flitch is thus accomplished, members 420*a* are released from the flitch as clamp pairs 412*a* are withdrawn from the vicinity of holder 470.

As illustrated in FIGS. 1 and 5, holder 470 is operated, i.e., bar 480 is caused to move upwardly or downwardly, by bar actuators 484*a*, 484*b* that are attached to outwardly facing sides of vertical struts 472*a*, 472*b*, and from within which bar rods 486*a*, 486*b* extend. The distal ends of bar rods 486*a*, 486*b* are attached to respective bar braces 488*a*, 488*b* which in turn are connected at right angles to opposite ends of bar 480.

When flitch $C_1A_1$ has been placed in the position shown in FIGS. 1, 2 and 3, actuators 484*a*, 484*b* are activated so as to bring bar 480 downward against the flitch. Thereafter, the unclamping of flitch $C_1A_1$ takes place by the withdrawal therefrom of clamp pairs 412*a*. To withdraw the clamp pairs, clamp traveler actuators 448*a* are activated so as to draw clamp travelers 416*a* away from holder 470. Flitch grippers 420*a*, which were located atop flitch $C_1A_1$, are urged downwardly by clamp springs 456*a*, and upon clamp travelers 416*a* moving a sufficient distance away from bar 480, flitch grippers 420*a* and hence clamp pairs 412*a* spring downwardly into positions corresponding to clamp pair 412*a'* in FIG. 3. The gripping of flitch $C_1A_1$ by bar 480 is accomplished with sufficient force such that neither the lateral nor skew positioning of the flitch will be disturbed by the frictional force of grippers 420*a* being withdrawn. Other biasing means such as air cylinders may be substituted for springs 456.

The clamps are repositioned so as to clamp a subsequent flitch that has been placed atop dead skid 406 by pin stop deck 386 and off-load deck 404. This step is accomplished by continuing the motion of clamp travelers 416*a* until clamp pairs 412*a* have assumed positions corresponding to clamp pair 412*b''* in FIG. 3.

Flitch $C_2A_1$ is treated in precisely the same manner as was flitch $C_1A_1$ except that the alternate pair of clamp mechanisms is used. Flitch $C_3A_1$ is treated using the same clamps as were used to clamp flitch $C_1A_1$. By continuing to alternate in using clamp pairs 412*a* and 412*b*, a continuous stream of flitches is provided, ready for resawing, to holder 470.

FIGS. 1 and 5 illustrate respective end and side views of a "flying saw" 490 which includes saw traveler 492 of known design. A flying saw may be employed, advantageously suitable for thicker (e.g. 4 or 6 inch) cants or flitches, which includes scanners capable of viewing side edges as well as the top of thicker cants.

In FIG. 1, a scanner 464 is illustrated as attached to a side of saw traveler 492 nearest dead skid 406. In FIG. 5, it is seen that traveler 492 is caused to move between the position shown in full line and the position shown in outline at 492', thus to traverse past the full length of holder 470 and of any cant held thereby. By this means, while employing scanner 464, the scanning step is carried out while a previous cant, if one is present, is cut in such a way that the cant being scanned remains motionless and it is the scanner 464 that is caused to move. An accurate scan of the cant is thereby obtained.

Final sawing of each cant is provided by vertical rotary saws 496*a*, 496*b* and 496*c*, 496*d* forming part of traveler 492 as shown in FIGS. 1 and 5. The two pairs of saws indicated are slidably disposed in a facing relation on respective axles in such a manner as to be laterally positioned thereon under remote control also in response to scanning, and/or according to desired lumber sizes. However, it is noted the system is desirably programmed to limit the motion of saws 496*a*, . . . , 496*d* such that none of them can assume lateral positions corresponding to that of holder 470. Holder 470 has a lateral dimension (at the height of saws 496*a*, . . . , 496*d*) of less than 2 inches, so that even a narrow flitch such as flitch $C_1A_1$ can be held in a proper lateral position and proper skew to be sawed, i.e., to have its waney edges removed.

The manner in which sawing and scanning operations cooperate can be appreciated from FIG. 2, in which saw traveler 492 is illustrated in a position in front of flitch $C_1A_1$. Scanner 464 is thus located at the near end of flitch $C_2A_1$. Upon traveler 492 being caused to move to the far end of flying saw 490 so as to assume the position shown at 492 in FIG. 5, flitch $C_1A_1$ will be sawn while flitch $C_2A_1$ is scanned. Further, as an example of the cooperative process, the sawing of flitch $C_2A_1$ and the scanning of flitch $C_3A_1$ will occur simultaneously.

Upon completion of the sawing of flitch $C_1A_1$, as above indicated, flitch $C_2A_1$ is placed on holder 470, flitch $C_3A_1$ is positioned for scanning, and rotary saws 496*a*, . . . , 496*d* are repositioned on their respective axles and the simultaneous sawing of the former and scanning of the latter take place. In this way not only is each flitch scanned by an alternating back-and-forth motion of traveler 492, but also successive cants are sawn by the same motion. The lateral positions of the respective pairs of rotary saws 496*a*, 496*b* and 496*c* and 496*d* are controlled such that, regardless of the direction of travel of traveler 492, the pair of saws that is first encountered is placed outermost so as to remove the wanes from the flitch, while the other pair of saws is placed inwardly so as to perform other cuts as may be required. Of course, in the case of a narrow flitch such as flitch $C_1A_1$ shown in FIGS. 2, 3 and 5, one pair of saws is used (to sever the wane).

Wane removers 498 lying parallel to holder 470, comprise elongate trough-like structures or bins with one such remover suitably being located on each side of holder 470. Each, in cross-section, approximates an isosceles triangle oriented such that the smaller angle is located near the top of holder 470. Wane removers 498 include elongate wane bases 500 into which the wanes can fall. Alternatively, bases 500 may be open on the bottom for emptying scrap into removal means, not shown. Between the wane bases, and facing sides of holder 470, are lumber conveyors 502 which can receive the boards from each sawing.

The sides of the wane removers facing lumber conveyors 502 are extended upwardly to near the top of the holder so that angles of approximately 60° to the horizontal are described by inner walls 504 whereby wanes sawn in the vicinity of holder 470 will be caused to fall into respective wane bases. End walls 506 terminate just short of ends of inner walls 504 nearest to the holder where portions of inner walls are thickened so as to provide wane lips 508 that first receive the wanes produced from sawing a cant.

The wane removal action is selectively accomplished by operation of wane remover actuators 512 rotatably attached to wane bases 500. The wane remover actuators are empowered by means not shown which translate wane bases 500 on tracks (not shown) whereby wane lips 508*a*, 508*b* become placed in positions, at the time of sawing, at the outer sides of respective saws 496*a*, 496*b* or 496*c*, 496*d* then employed to remove wanes from a flitch. That is, when a flitch has been positioned and skewed for sawing, the lateral positions at which wane cuts will be made are determined for setting the saws, and wane lips 508 are positioned to receive the wanes produced. The wane removers are then translated away from holder 470 so that sawn lumber can be received on conveyors 502*a*, 502*b* when bar 480 is moved upwardly.

Figure 6:
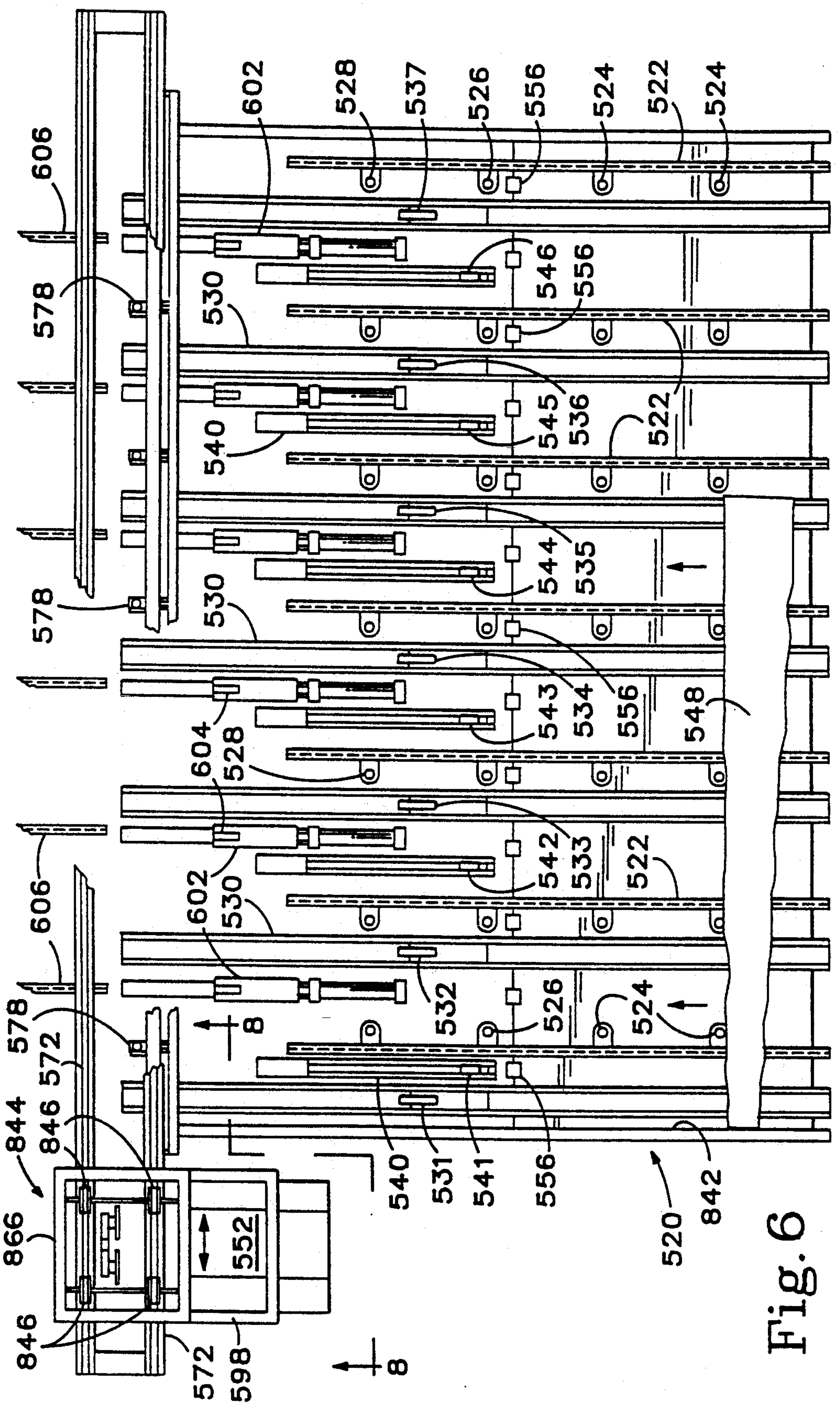
FIG. 6 is a plan view of a portion of a pin stop deck according to a second embodiment of the present invention.

Referring to FIG. 6 comprising a plan view of a portion of a sawmill according to a second embodiment of the present invention, pin stop deck 520 includes a conveyor system comprising chains 522 for conveying cants or flitches, such as flitch 548 in the direction indicated by the arrows. The cant or flitch 548 is even ended against guide 842 (by means not shown) and is temporarily halted in its progress toward saw 844 by rows of pin stops 524 located adjacent friction conveyor chains 522. To allow progress of the flitch forwardly, a row of pin stops is lowered for a sufficient period of time to allow a given flitch to pass and be moved by the conveyor chains against the next row of pin stops. During the course of being transported laterally forwardly in this manner, flitch 548 passes over photocells 556 the purpose of which is preliminarily measurement of the width and overall plan profile of the flitch. Light sources (not shown) are positioned above the path of flitches on the pin stop deck for directing light beams toward the respective photocells such that the presence of a flitch is detected by the interruption of a light beam as the flitch travels. The length of the flitch with respect to guide 842 is ascertained with the photocells whereby a determination can be made as to the conveying means which will be subsequently employed for moving the flitch.

When the flitch reaches a last row of pin stops 528, and when these pin stops are lowered, the rear edge of the flitch is engaged by a pair of dogs selected from the group bearing reference numerals 541-546. Dogs 541-546 respectively move along tracks 540 which are upraisable at the rearward end thereof (by means not shown) to place the selected dogs behind the flitch. A pair of dogs selected typically comprises lefthand dog 541 or the next adjacent dog 542, and a dog located toward the right end of the flitch as viewed in FIG. 6 according to the length determination made by photocells 556. Selected dogs are adapted to move forwardly by piston operation in aligned relation with one another whereby the rearward edge of the flitch will be disposed in substantially perpendicular relation to the direction of forward travel.

The rearward edge of the flitch is next engaged by a pair of skew clamps selected from a group of clamps 531-537, with the selection thereof again being made in accordance with the length of the flitch as was determined by means of photocells 556. These clamps are slidable upraisable clamps each of the type illustrated at 412*a* or 412*b* in FIGS. 2 and 3 and at 412 in FIG. 1. One of the pair of skew clamps 531 and 532 will be employed, together with one of the skew clamps 534 or 535 in accordance with the length of the flitch. Movement of the flitch in the forward direction is at this time along rails 530 under the impetus of ones of the skew clamps 531-537 since the conveyor chains 522 drop below the level of rails 530 beyond the position of pin stops 528 in somewhat the manner illustrated for conveyor 392 in the first embodiment of the invention as shown in FIGS. 1 and 3.

The skew clamps selected from the group identified by reference numerals 531-537 are moved forwardly to place the flitch at a first station under the path of movable scanner 552 attached to the frame of, and movable with, saw 844 which is adapted for transport in a direction crossways of the pin stop deck and longitudinal of the flitches. At this time, the skew clamps move the flitch so its center line is perpendicular to the line of travel of the flitch toward the saw and centered under the path of scanner 552 as it moves with the saw in the direction indicated by the arrow. After scanning, the flitch is transported farther forward to a second station or sawing position with the flitch being skewed via differential forward movement of the skew clamps so that the forward wane will be removed in an optimum manner for most efficiently utilizing the flitch. The forward side edge of the flitch is correctly aligned with the path of saw 844 in response to computer determination of the location of the wane according to the data from scanner 552. In accordance with customary practice, two-thirds of the waney edge is removed at its greatest incursion into the flitch. As in the previous embodiment, a given cant or flitch is sawn while the just previous cant or flitch in a progression of cants or flitches conveyed on the pin stop deck is scanned by the movable scanner as attached to the movable saw frame or carriage.

Figure 7:
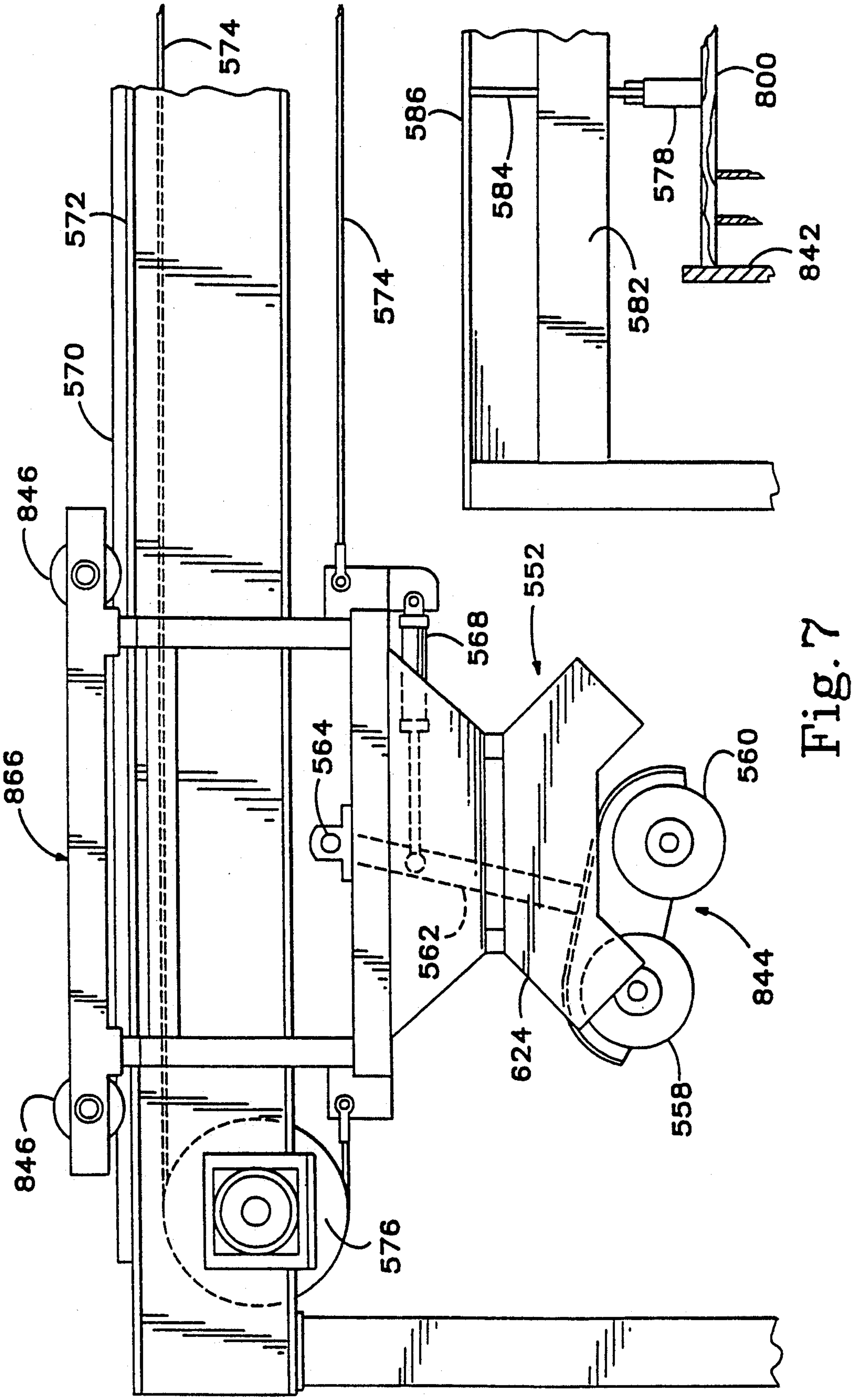
FIG. 7 is an elevational view, taken at 7—7 in FIG. 6, depicting a flying saw carriage.

Referring to FIGS. 6 and 7, the saw 844 includes counter-rotating sawblades 558 and 560 mounted on a support at the lower end of pivoting arm 562. Arm 562 is supported from an axle 564 and is adapted for swinging movement so that either sawblade 558 or sawblade 560 will be in wood-engaging position while the remaining sawblade is upraised. When the saw has fully traversed the length of the flitch and the wane has been substantially removed therefrom, a following flitch (which has just been measured by scanner 552) will be transported to the sawing position and pivoting arm 562 will then swing the saw arm such that the appropriate blade is lowered to engage the wood on a reverse pass along the same saw line.

Figure 8:
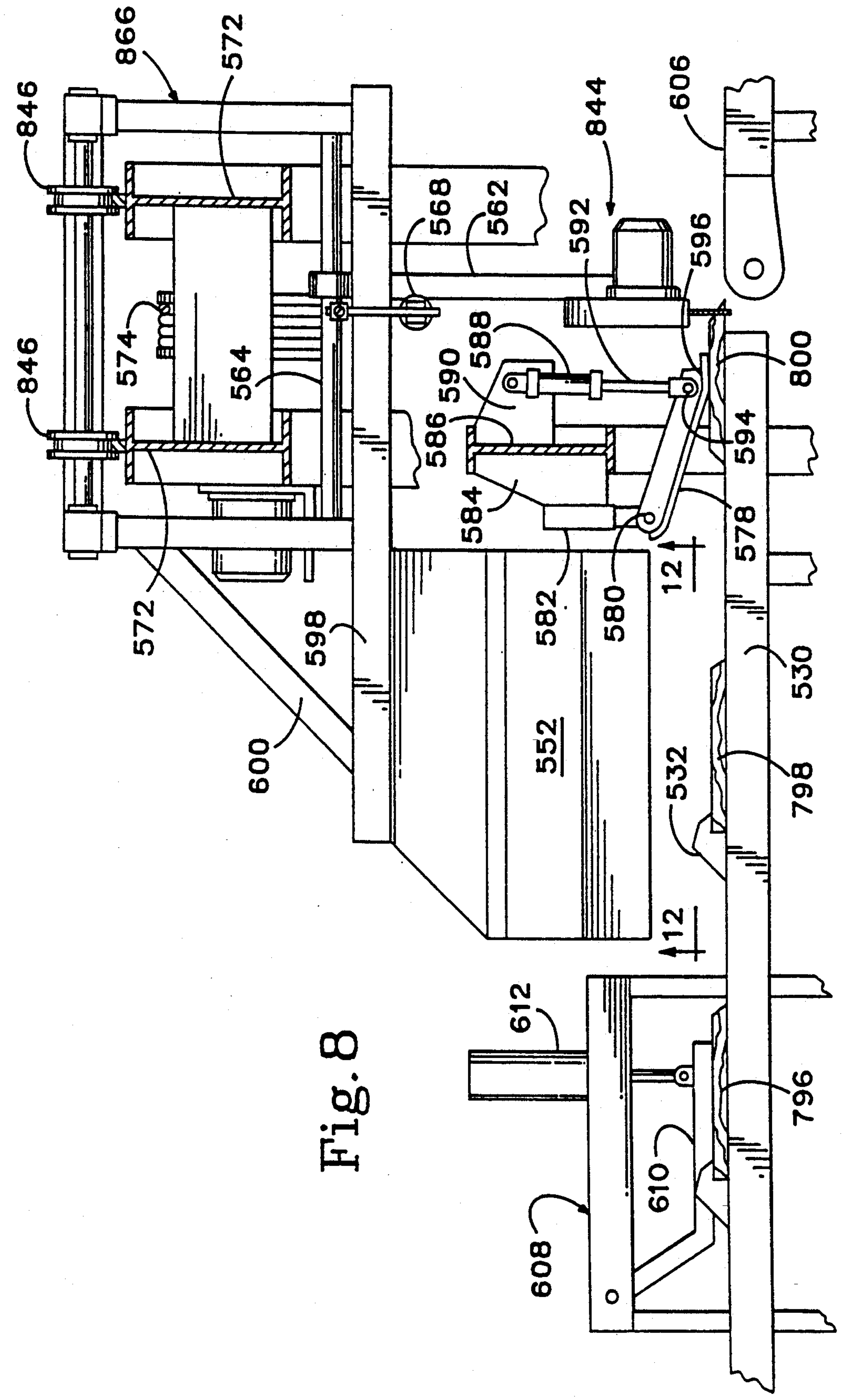
FIG. 8 is a vertical cross section taken across the saw line of the apparatus and illustrating the movable saw and scanning means.

Axle 564 is supported from carriage 566 which also pivotally engages the end of cylinder 568 adapted for moving arm 562 back and forth. The carriage moves on grooved wheels 846 along rails 570, in turn mounted on I-beam supports 572. A cable 574 passing around powered drum 576 located between I-beams 572 at the left end of the structure as viewed in FIG. 7 is used for translating the carriage 866 back and forth in the sawing direction. Referring particularly to FIG. 8, a flitch in the sawing position, for example flitch 800, is being held in the sawing position by a plurality of pivotable holder bars 578 each having a pivoting axis 580 supported by a rod depending from side beam 582 attached by webs 584 to horizontal beam 586 located obliquely above and parallel to the sawing direction. A pneumatic piston 588 is pivotally supported from plate 590 secured to the opposite side of the beam 586 and is adapted for raising and lowering piston rod 592 having a pivotal connection 594 with the lower end of holder bar 578. Holder bar 578 is supplied with a lower flange formed to provide a foot 596, substantially horizontally oriented when in its lower position, for engaging the upper face of flitch 800 whereby to secure the flitch in the sawing position. While flitch 800 is being sawn, the previous flitch, 798, is scanned by scanner 552 supported at the side of carriage 866 from undercarriage beams 598 and braces 600.

Referring to FIGS. 6 and 8, when the forward wane has been substantially removed from a flitch 800 by traversal of saw 844 along the forward edge of the flitch, the flitch is transported forwardly by piston operated ejectors 602, and particularly by dogs 604 thereof which urge the flitch onto outfeed conveyors 606. A flitch 796, prior to flitch 798 in the sequence delivered along rails 530, is being held by hold-down apparatus 608 at its smaller end (the end corresponding to the leftward position of a flitch in FIG. 6 adjacent guide 842). The hold-down apparatus 608 comprises a pivotable hold-down shoe 610 operated by air cylinder 612 and functions in a manner hereinafter more fully described.

Figure 9:
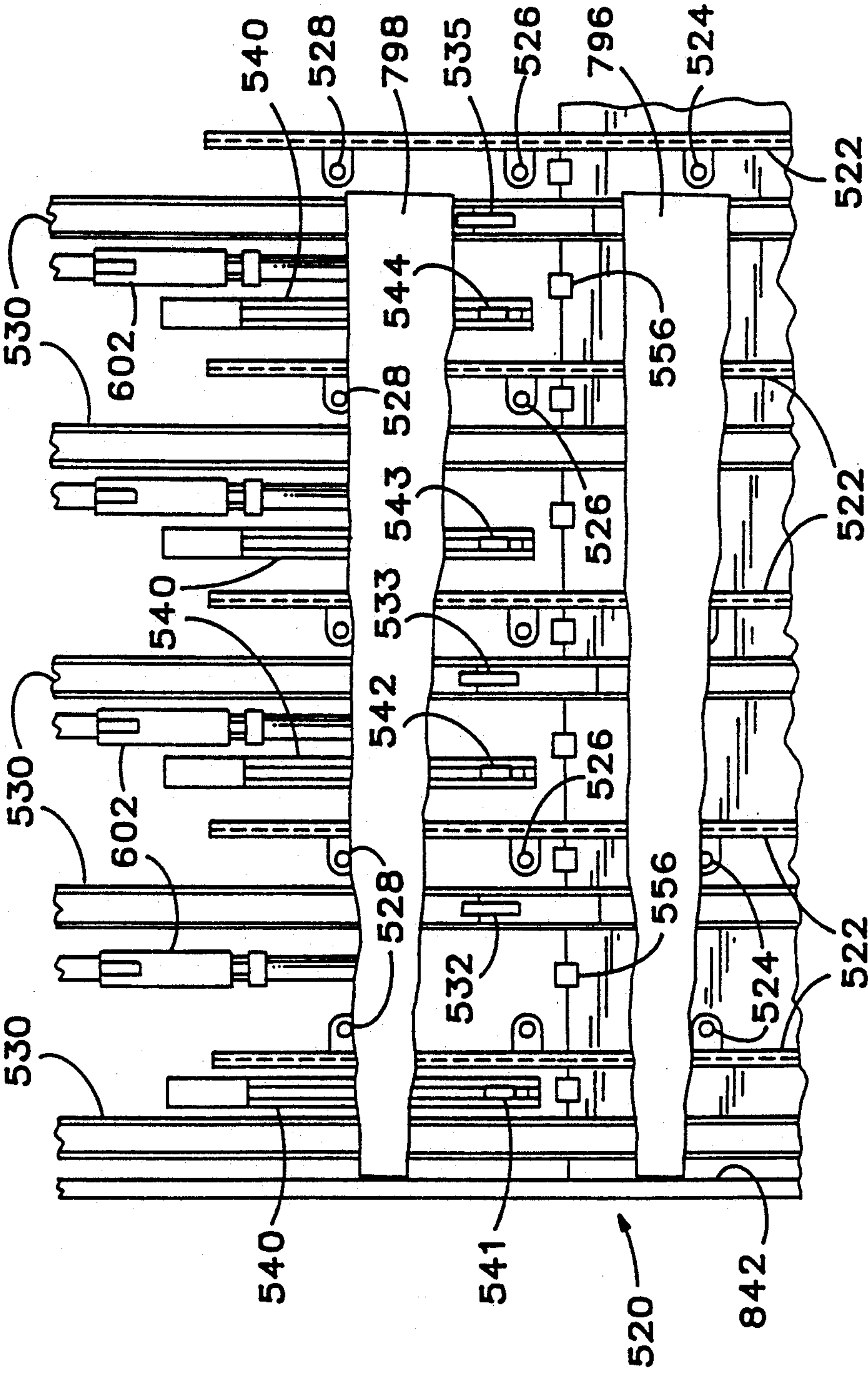
FIG. 9 is a partially broken away plan view of a portion of the FIG. 6 pin stop deck illustrating the position of successive flitches as moved therealong.
Figure 10:
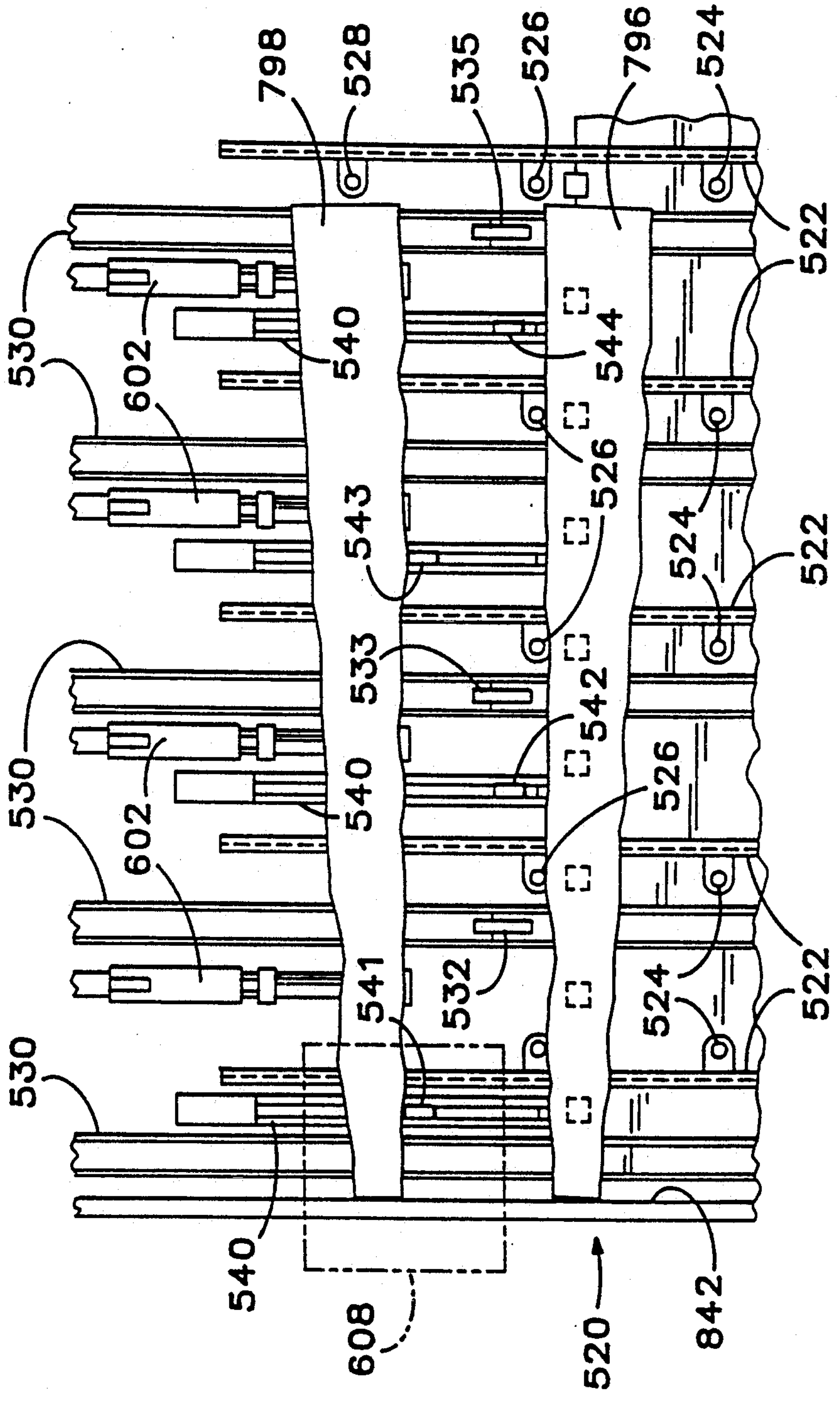
FIG. 10 is a partially broken away plan view of the same pin stop deck showing a further position of the flitches.
Figure 11:
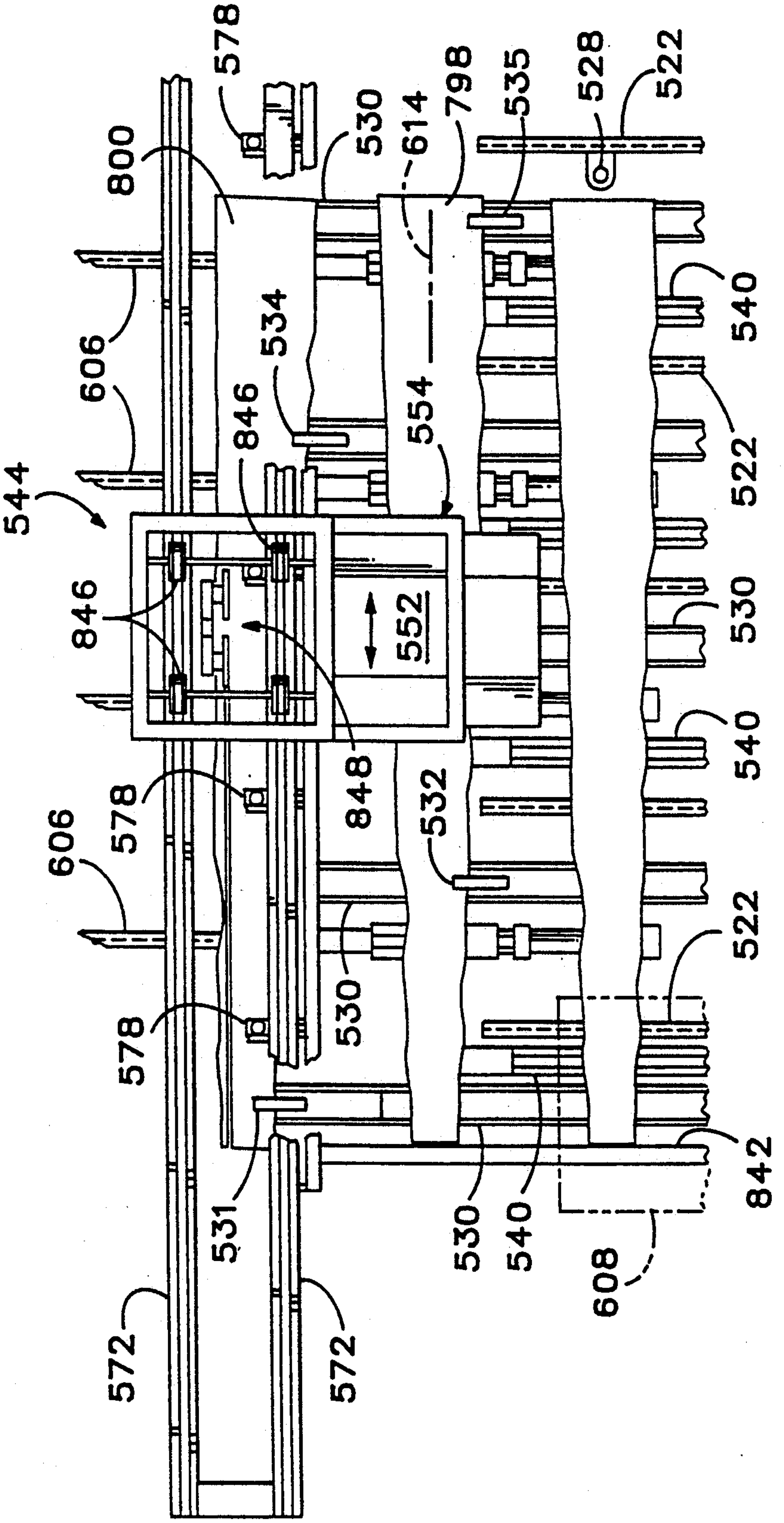
FIG. 11 is a partially broken away plan view of the pin stop deck illustrating the positions of flitches in a yet further part of a sequence wherein one of the flitches is being sawn at its forward edge.

Referring to FIGS. 9, 10 and 11, in part illustrating the progression of a typical flitch 798 through the preliminary aligning and scanning cycle, the flitch is illustrated in FIG. 9 as having been conveyed against pin stops 528 with the forward edge of the flitch disposed in substantially perpendicular relation to the direction of travel thereof along the pin stop deck. In FIG. 9, a prior flitch 796 is being conveyed with chains 522 toward the next to the last row of pin stops 526. The pin stops 528 are then dropped and a pair of dogs, 541 and 543, are raised to engage the rearward edge of flitch 798, as illustrated in FIG. 10, for placing the left end of the flitch approximately centrally below hold-down mechanism 608 where it is engaged by lowering shoe 610 by means of air cylinder 612. The purpose of forward movement by dogs 541, 543 is to reposition flitch 798 with the rearward edge thereof perpendicular to the direction of travel, and hold-down mechanism 608 ensures the flitch is rotated in a counterclockwise direction (in plan view) with respect to the orientation of flitch 798 illustrated in FIG. 9 when the forward edge of the flitch was engaged by certain pin stops 528. Without the hold-down mechanism 608, there can be a tendency for the wider and hence heavier right end of the flitch to bring about rotation in a clockwise direction, or at least maintain the orientation shown for flitch 798 in FIG. 9.

Dogs 541, 543 in FIG. 10 are near the forward end of their movement wherein the flitch 798 is disposed in its desired position with respect to hold-down means 608. Dogs 541 and 543 are then lowered. It will be appreciated that a pair of the dogs 541, 546 has been selected for the foregoing operation in accordance with the length of the flitch as determined with photocells 556. During the foregoing operation, flitch 796 is received against pin stops 526 that will be subsequently lowered so that flitch 796 can be driven forward via the conveyor chains against pin stops 528.

After the flitch 798 has been moved forwardly so that its leftmost end resides under hold-down mechanism 608, and dogs 541, 543 have been dropped, the rearward edge of flitch 798 is engaged by a pair of skew clamps 532, 535 selected from the group of skew clamps 531–537. The previous passage of flitch 798 over photocells 556 will have measured the width of the flitch at various spaced locations thereupon for indicating how far the back edge of the flitch is from the flitch's centerline. The skew clamps 532, 535 are programmed by computer control to place the centerline 614 of the flitch in coincident relation with the centerline of scanner 552 as it travels over the length of the flitch in the manner illustrated in FIG. 11, at the same time saw 844 is substantially removing the waney forward edge of a previously measured flitch 800. After the saw carriage has fully traversed the length of flitches 800 and 798 in the described manner, sufficient data has been collected for establishing a 3-dimensional "model" of flitch 798 in computer memory whereby the flitch 798 can then be moved forwardly and oriented so that the desired proportion of the forward waney edge thereof extends just beyond the saw line of saw 844 subsequent to the removal of flitch 800 by the hereinbefore described operation of dogs 604 of ejector means 602. (See FIG. 6.) It will be noted travel of scanner 552 over flitch 798 is with respect to a stationary flitch whereby the accuracy of the profile information derived is enhanced. Then the same skew clamps as securely engage the flitch are employed for accurate positioning of the flitch beneath saw 844 whereby the waney edge is accurately trimmed. Also, the travel of the scanner and the saw are accurately coordinated since they comprise parts of the same carriage. This continuous control of the relative positions of the flitch along rails 540 between scanning and sawing, without opportunity for the flitch to become wrongly oriented with respect to the saw or scanner, has been found to produce advantageously accurate results.

The skew clamps 532 and 535 were selected in accordance with the length of the flitch as determined when the flitch passed over photocells 556. One of the leftmost skew clamps 531, 532 is always selected, together with a second skew clamp as determined by the length of the flitch. As can be seen in FIG. 11, the previously measured flitch being sawn in FIG. 11, i.e., flitch 800, was engaged, at least prior to operation of holder bars 578, by skew clamps 531, 534. In a usual physical embodiment, skew clamps 531 and 532 are preferably disposed in their respective rails 530 in relatively more closely spaced parallel relation than the remainder of the skew clamps so that a selected skew clamp of the pair 531, 532 will be near to the lefthand end of the flitch. Sets of skew clamps, i.e., set 531, 534 and set 532, 535, operate in the alternative for engaging successive flitches as illustrated in FIG. 11. After the forward flitch (flitch 800 in FIG. 11) is engaged by holder bars 578, skew clamps 531, 534 are withdrawn rearwardly and dropped for subsequent engagement with an oncoming flitch 796 in the manner illustrated in FIG. 8.

It will be observed that as a given flitch is moved by skew clamps, and is appropriately skewed thereby, the next flitch in line is moved forwardly by a second set of clamps to the scanning position. During this time period as well as during the immediately following time period when one flitch is being sawn and the next previous flitch is being scanned, the pin stops of the next-to-the-last set are lowered whereby preliminary scanning of the next follow-on flitch (e.g. 796) is completed and that follow-on flitch (796) is engaged employing an appropriate pair of dogs 541, 546 whereby such flitch is moved under the hold-down mechanism 608 to be engaged by a set of skew clamps. Then, as the just-sawn flitch is removed via ejector means 602, the flitch just measured is driven forward by means of skew clamps to the sawing position while the next follow-on flitch is moved forwardly with a set of skew clamps to the scanning position.

Figure 12:
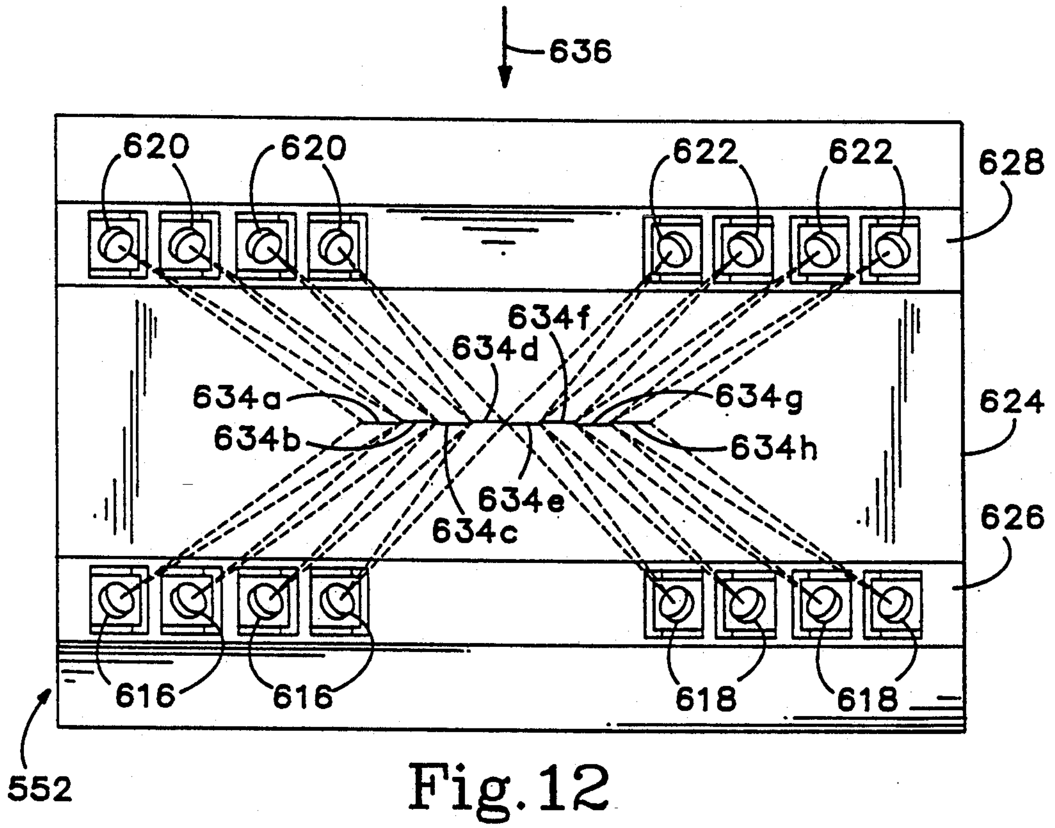
FIG. 12 is a view of the underside of scanning means, said view being taken at 12—12 in FIG. 8.
Figure 13:
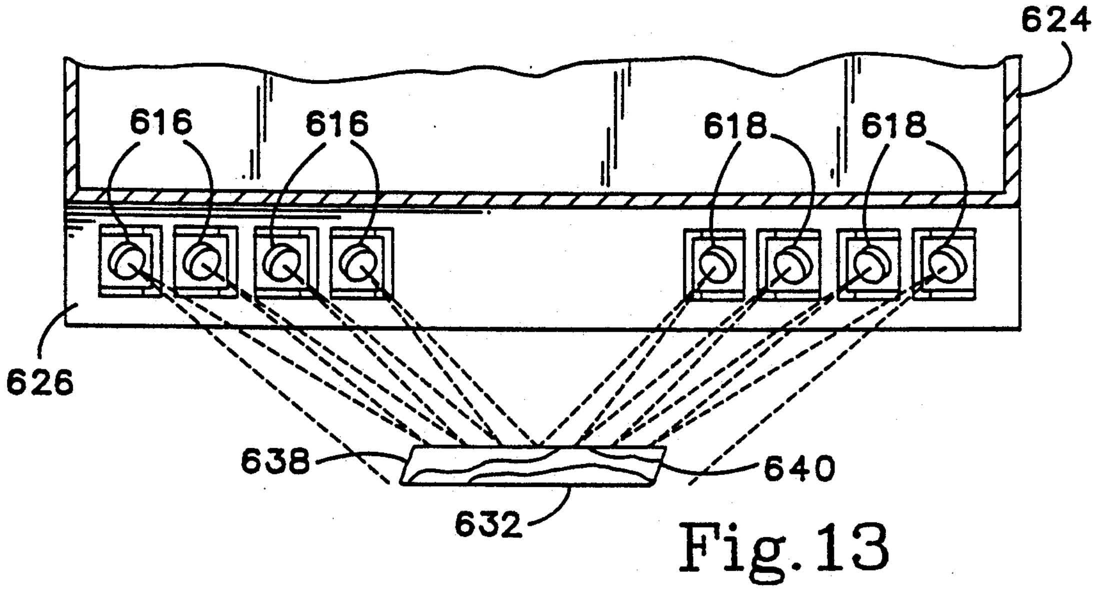
FIG. 13 is a cross sectional view of a portion of the scanning means as taken at 13—13 in FIG. 14.
Figure 14:
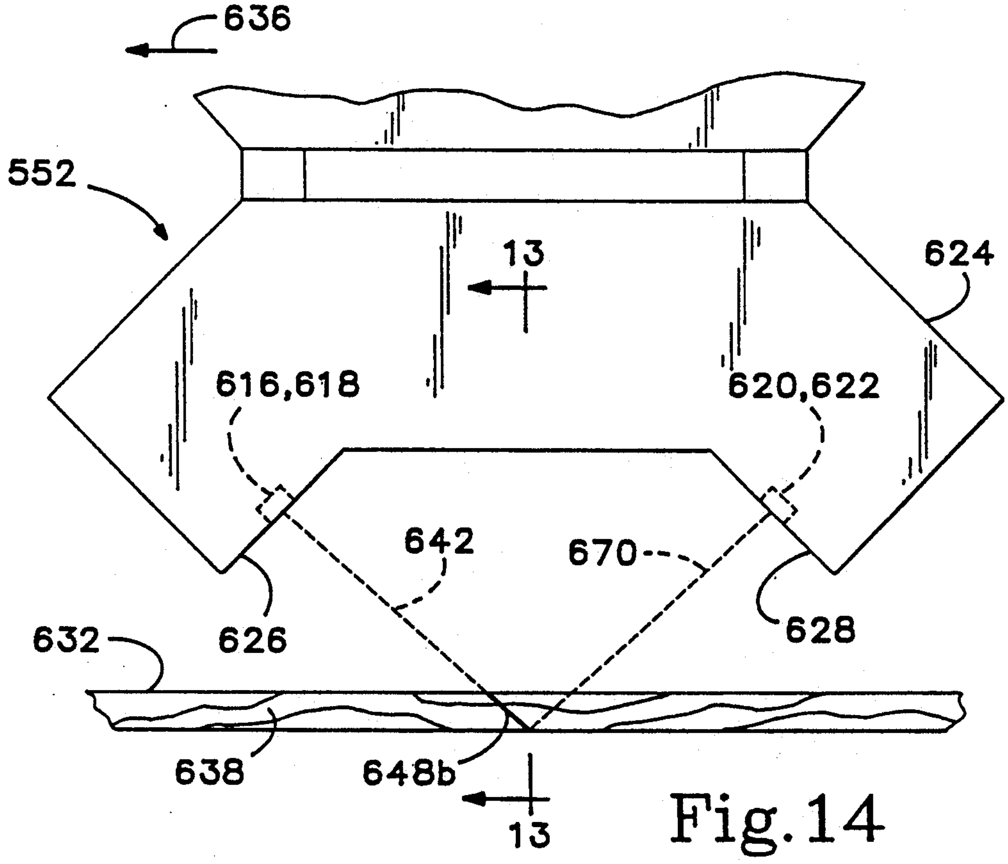
FIG. 14 is a partially broken away elevational view of the scanning means.

Referring to FIGS. 12 through 14, more fully depicting a scanner apparatus 552, a hood 624 suspended from undercarriage beams 598 (FIG. 8) carries a plurality of radiation (preferably laser light) sources 616, 618 and a plurality of television cameras 620, 622 which are inset within tapered sidewalls 626 and 628 on the underside of hood 624 whereby a flitch 632, centrally disposed under the scanner apparatus, can be illuminated and viewed. It will be understood that cant or flitch 632 has been brought forward on rails 630 so that its centerline is disposed in substantial coincidence with the centerline and direction of travel of scanner apparatus 552 along the length of the flitch. The laser light sources 616, 618 comprise commercially available solid state lasers provided with cylindrical lenses for conjointly projecting a narrow line crossways of the cant or flitch 632, wherein the individual line segments projected by each light source were each slightly over five inches in length in a particular embodiment. FIG. 12 is a view from underneath the scanner apparatus 552, from the viewpoint of a flitch being scanned in the direction of arrow 636 and lines 634 represent the elongated (line) images projected from sources 616, 618 as they would be seen at the level of rails 630. Lines **634*a* through 634*d* are respectively provided by light sources 616, while lines 634*e* through 634*h* are projected from light sources 618. As will be noted, the lines 634*a* through 634*h* are nearly aligned and the combined extent thereof is adapted to be longer than the expected crossways dimension of the widest flitch or cant received by the apparatus according to the present invention. The lines 634*a* through 634*h*** are projected so that no linear gaps appear therebetween, i.e., so that there is a slight overlap from one line to the next.

Each of the lines is viewed by means of a separate television camera suitably of the solid state CCD target type, positioned as indicated within tapered wall 628 of hood 624. The respective cameras 620 are adapted to view lines **634*a* through 634*d*, while cameras 622 are similarly adapted to view lines 634*e* through 634*h*. Each executes a raster scan having raster lines substantially perpendicular to the line images viewed. Cameras 620 view projected lines from the middle toward and over the leading side edge of the flitch and cameras 622 view lines from the middle and over the trailing side edge of the flitch, in each case viewing lines or line segments as projected on the waney edges 638 and 640 in FIG. 14. Each camera suitably has a field of view of about five inches, i.e., for viewing the length of one of the lines 634*a* through 634*h***. Providing multiple cameras and illumination sources enhances the ability of the apparatus to scan all the way across the flitch including side edges thereof. Image acquisition times of the cameras are offset (adjacent cameras are suitably operated in alternate sets) and the laser sources are appropriately pulsed so the individual line segments can be detected by the camera directed theretoward without crosstalk. In a particular embodiment, alternate sets of cameras were exposed to line images for periods of 500 microseconds after which the targets were read out for the remaining portion of a 16.6 millisecond frame interval.

The purpose of the scanner is to provide sufficient data for computer construction of a 3-D image of the flitch whereby the flitch can then be properly positioned relative to the saw so that a desired proportion of the waney edge can be removed. The scanner provides successive vertical profiles of the flitch, e.g. at two or three inch intervals along the flitch as the scanner moves, from which the complete flitch can be characterized by the computer including a substantially complete description of the waney edges thereof.

As hereinbefore mentioned, one of the problems with conventional scanning relates to difficulty with respect to characterizing a negative or undercut wane, e.g. of the type indicated at 640 in FIG. 13, by means of scanner apparatus located above the flitch. In accordance with the present invention, plural sources of illumination and cameras which view projected illumination are employed with units thereof located substantially outboard of the expected width of the cant or flitch in order to view the side edges of the cant or flitch, including any negative wane or under-wane. In a typical instance, the maximum width for flitches received by the apparatus of FIGS. 6–13 is approximately 35 inches, while the average distance between radiation source banks 616 and 618 in FIG. 13 was approximately 50 inches or greater so as to provide projection and viewing inwardly toward the sides of the flitch. Moreover, the radiation sources direct beams for projecting the aforementioned lines **634*a* through 634*h* via oblique paths and the line images are similarly viewed obliquely by means of the cameras 620, 622. Radiation sources are located above, outboard and forwardly along the flitch from the line image, while cameras are located above, outboard and rearwardly along the flitch from the line image. Of course, the positions of radiation sources and cameras can be interchanged. Considering the light projection path 642 from one of the sources 616, 618, and the viewing path 670 of the corresponding one of the viewing cameras 620, 622 in FIG. 14, the radiation sources and cameras are preferably positioned such that the angle therebetween in the plane of paths 642 and 670** is approximately 90°, wherein each path makes an angle of approximately 45° with respect to the vertical. Therefore each camera has a light viewing path which is nearly perpendicular to the line "drawn" at approximately 45° to the vertical on the edge of the flitch to provide face-on viewing and therefore maximum definition. Moreover, such line drawn on the flitch by a laser source is projectable onto a negative or undercut wane in a manner fully viewable by a camera, up to a negative wane or undercut of about 18° from the vertical in the illustrated embodiment.

Figure 15:
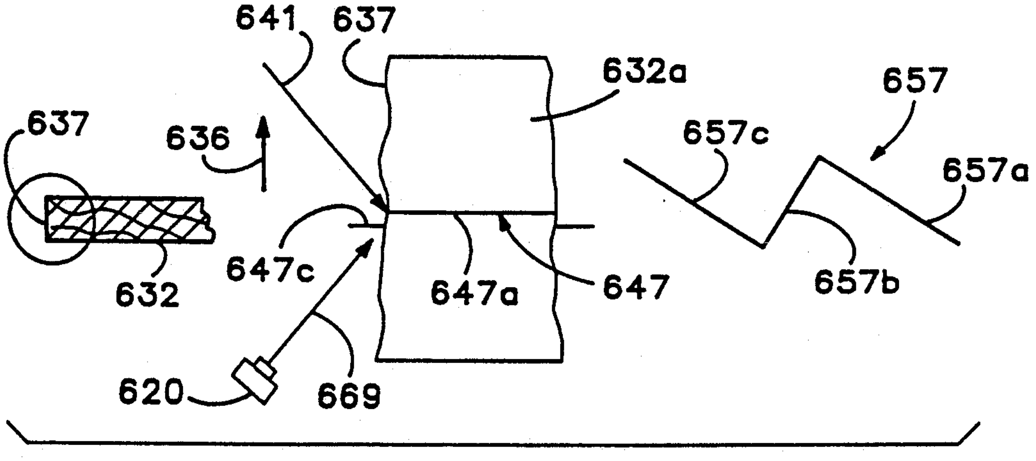
FIG. 15 is a schematic representation of scanning means viewing a flitch with a straight forward edge.
Figure 16:
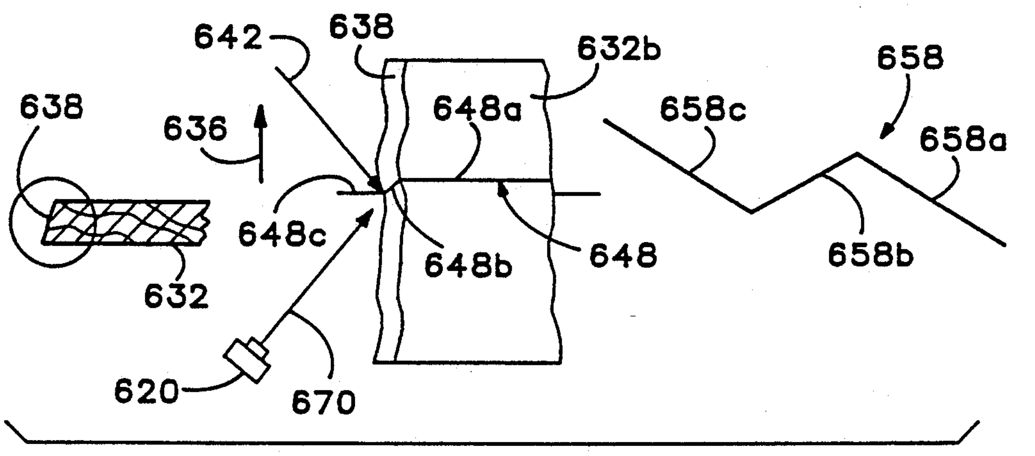
FIG. 16 is a schematic representation of scanning means viewing a flitch having positive wane.
Figure 17:
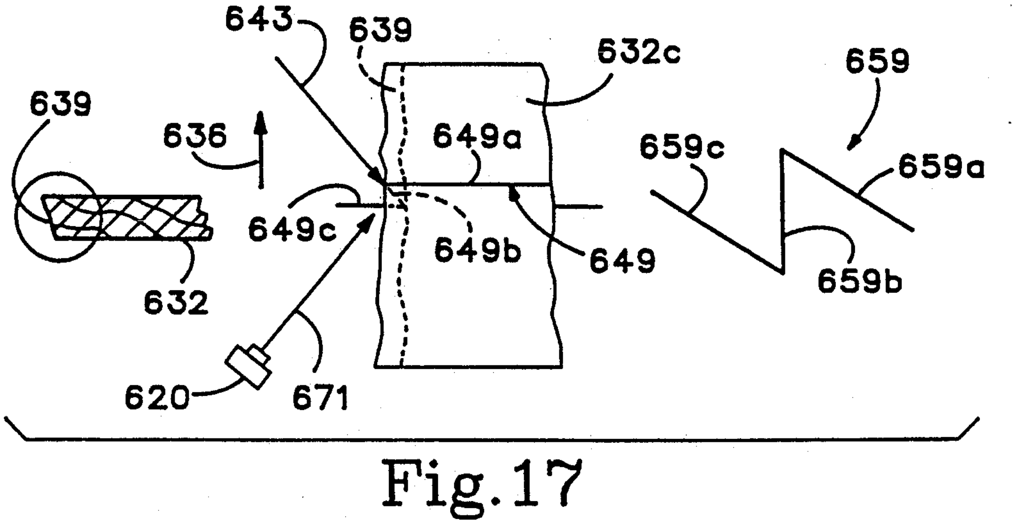
FIG. 17 is a schematic representation of scanning means viewing a flitch having negative wane.

Referring to FIGS. 15, 16 and 17, schematically illustrating a flitch 632 which is to be scanned, it will be assumed the scanner is being moved in a direction 636 along the length of the flitch (although it will be appreciated the scanner moves in alternate directions for successive flitches received by the apparatus). The upper face of the flitch is disposed in a horizontal plane inasmuch as the lower parallel face of the flitch is supported on rails 530 (not shown in these figures).

Flitch **632*a* in FIG. 15 is assumed to have a side edge 637 perpendicular to the face. Beam 641 from the laser light sources, disposed above and obliquely to the side and forward along the flitch of the intended intersection of the light beam and the flitch, "draws" a line 647 across the flitch including a portion 647*a* on the top face of the flitch. A camera 620 above the flitch and obliquely to the side and upstream along the flitch (rearward along the flitch) from line 647 is employed for viewing the line 647. The camera 620 is tilted and rotated somewhat to provide a good view not only of the line portion 647*a*, but also the line portion as projected on side edge 637. The resulting camera depiction of the line 647 is shown at 657, including a line portion 657*a* for the top surface of the flitch at 647*a* a line portion 657*b* for the edge of the flitch, and a line portion 657*c* as would be projected at 647***c* on a surface extended from the lower face of the flitch.

In FIG. 16, a flitch 632*b* is depicted having a positive wane 638, and a laser beam 642 is provided from a laser light source above, obliquely to the side and forwardly along the flitch for "drawing" line 648 including a portion 648*a* on the upper face of the flitch and a portion 648*b* (on wane edge 638) which makes an angle of approximately forty-five degrees with respect to the vertical. (See also FIG. 14.) The camera "sees" a configuration illustrated at 658; via path 670, comprising a line portion 658*a* representative of the upper face of the flitch, a portion 658*b* representative of the waney edge 638 at 648*b;* and a portion 658*c* representing the lower face extended of the flitch or the bed portion of the machine at 648*c.*

In FIG. 17, flitch 632*c* is assumed to have an edge 639 displaying negative wane or an undercut edge so that it cannot be viewed from directly above the flitch. A laser beam 643 from a source above, obliquely at the side and forwardly along the flitch "draws" a line 649 crossways of the flitch including a portion 649*a* on the upper face of the flitch, a portion 649*b* on the negative waney edge of the flitch, and a line portion 649*c* at the level of the lower face of the flitch. Camera 620, disposed above the flitch, obliquely to the side thereof and rearwardly along the flitch from line 649, views the line 649 via path 671 to provide the representation shown at 659 including a portion 659*a* representing line portion 649*a* on the upper face of the flitch, a portion 659*b* representing portion 649*b* on the waney edge of the flitch and a line representation 659*c* for a line portion 649*c* at the machine bed level.

As the scanner moves along the flitch, successive lines are "drawn" across the flitch at two or three inch intervals, each representing a profile or cross section of the flitch taken at an angle dictated by the angle of the beams from sources 616, 618. From these successive profiles, an accurate representation, or model of the entire 3-dimensional flitch is assembled by computer means in a manner understood by those skilled in the art, taking into consideration mathematically the oblique angle to the vertical at which lines on the side edge of the flitch are "drawn". Then, the extent of forward movement of the flitch can be determined, together with the proper skew thereof, so that part or all of the wane is removed at the forward edge of the flitch.

In the foregoing discussion, movement of the scanner has been described in a selected direction along the forward edge of the flitch for subsequent sawing by saw 844. However, the apparatus operates in a identical manner for movement of the scanner in the reverse direction along the next flitch, while the flitch just having been measured is sawn. Also, a portion of the line across the flitch, and in particular line segments 634*e*, 634*f*, 634*g* and 634*h*, are viewed at the trailing edge of the flitch by camera means 622 which operate in a similar manner to further characterize the flitch. The apparatus in FIGS. 6–14 provides a finished edge at the forward side of the flitch to form a datum plane, with further saw means (not shown) being employed in the overall production process to saw the flitch into finished lumber in accord with the computer characterization thereof in response to the images supplied by cameras 622 as well as 620.

While plural embodiments of the present invention have been shown and described, it will be apparent to those skilled in the art that many changes and modifications may be made thereto without departing from the invention in its broader aspects. The appended claims are therefore intended to cover all such changes and modifications as fall within the true spirit and scope of the invention.

We claim:

1. Scanning apparatus for viewing a wood member for the purpose of ascertaining the profile thereof, said wood member including faces and a side edge, said apparatus comprising:

illuminating means providing a beam of radiation for projecting an elongated image inwardly in intersecting relation with said side edge and a face of said wood member from a direction obliquely above and to the side of said side edge and along said wood member in a first sense, and means for viewing said elongated image from a direction obliquely above and to the same side of said side edge and along said wood member in a second sense so that said image is viewed at a substantial angle.

2. The apparatus according to claim 1 wherein said image is the image of at least one line.

3. The apparatus according to claim 1 wherein said substantial angle is approximately ninety degrees.

4. The apparatus according to claim 1 wherein said illuminating means comprises laser light source means.

5. The apparatus according to claim 1 wherein said viewing means comprises at least one television camera.

6. The apparatus according to claim 1 wherein said elongated image comprises a plurality of substantially aligned line segments extending crossways of said wood member.

7. Scanning apparatus for viewing a wood member having substantially parallel faces and a tapered side edge for the purpose of generating a profile from which a model of said member can be provided, said apparatus comprising:

means for supporting said member with an upper face thereof disposed in a substantially horizontal plane, illuminating means providing a beam of radiation for projecting a machine viewable elongated image substantially crossways of the upper face of said member and onto said side edge, means for mounting said illuminating means above said wood member at a position laterally displaced from the side edge of said wood member and longitudinally displaced in a first direction along said wood member from the location of the projected image on said wood member so that said beam extends inwardly and intersects said member obliquely for illuminating said side edge to provide the elongated image on said side edge at an angle to the vertical, detecting means for viewing said projected image, and means mounting said detecting means above said wood member at a position also laterally displaced from the same side edge of said wood member but longitudinally removed in a second direction opposite said first direction along said wood member from the location of said projected image so that said detecting means views said elongated projected image on the side edge of said wood member at a substantial angle to said image in order to facilitate accurate modeling of said side edge.

8. The apparatus according to claim 7 wherein said elongated image is the image of at least one line.

9. The apparatus according to claim 7 wherein said substantial angle is approximately ninety degrees.

10. The apparatus according to claim 7 wherein said angle to the vertical is approximately forty-five degrees.

11. The apparatus according to claim 10 wherein said substantial angle is approximately ninety degrees.

12. The apparatus according to claim 7 wherein said illuminating means comprises laser light source means.

13. The apparatus according to claim 7 wherein said illuminating means comprise a plurality of radiation sources for conjointly projecting a line image crossways of said member and onto said side edge, wherein individual radiation sources provide segments of said line image, and wherein said detecting means comprise plural television cameras for viewing said segments, the radiation sources being generally aligned crossways of said member and the television cameras being generally aligned crossways of said member but displaced along said member from said radiation sources.

14. The apparatus according to claim 13 further including an additional plurality of radiation sources for projecting a line image comprising an extension of the first mentioned line image substantially crossways of the upper face of said member and onto a second side edge, and an additional plurality of television cameras for viewing said extension, including means mounting the additional radiation sources above said wood member at a position laterally displaced from the second side edge of said wood member and longitudinally displaced in a given direction along said wood member from the location of the line image extension, and means mounting the additional television cameras above said wood members at a position laterally displaced from the second side edge of said wood member but longitudinally removed in a direction opposite said given direction along said wood member from the location of the line image extension.

15. The method of viewing a wood member having substantially parallel faces and a tapered side edge, said method comprising:

projecting an elongated image inwardly and substantially crossways of a face of said wood member and onto said side edge from a location laterally outboard from said side edge and along said wood member from said image in a first direction, and electronically viewing said elongated image from a second location laterally outboard from said side edge and disposed along said wood member in a second direction opposite said first direction for viewing said image at a substantial angle.

16. The method according to claim 15 wherein said substantial angle is approximately ninety degrees.

17. The method according to claim 15 wherein said elongated image comprises a line image.

* * * * *